(12) United States Patent
Mills et al.

(10) Patent No.: US 6,380,503 B1
(45) Date of Patent: Apr. 30, 2002

(54) APPARATUS AND METHOD USING COLLIMATED LASER BEAMS AND LINEAR ARRAYS OF DETECTORS FOR SIZING AND SORTING ARTICLES

(76) Inventors: Daniel G. Mills, 6422 Alexandria Pl., Stockton, CA (US) 95207; Michael A. Valdez, 10123 Creekside Ct., Stockton, CA (US) 95209

( * ) Notice: Subject to any disclaimer, the term of this patent is extended or adjusted under 35 U.S.C. 154(b) by 0 days.

(21) Appl. No.: 09/519,726

(22) Filed: Mar. 3, 2000

(51) Int. Cl.⁷ .............................. B07C 5/10; G01B 11/02
(52) U.S. Cl. ..................... 209/586; 209/579; 356/385
(58) Field of Search ............................. 209/586, 579, 209/577, 576; 356/383, 384, 385, 379, 380

(56) References Cited

U.S. PATENT DOCUMENTS

| | | | |
|---|---|---|---|
| 3,513,444 A | * 5/1970 | Henderson et al. | 356/627 |
| 3,588,480 A | * 6/1971 | Unger | 702/156 |
| 3,727,069 A | * 4/1973 | Crittenden, Jr. et al. | 250/222.1 |
| 3,930,994 A | 1/1976 | Conway et al. | |
| 4,490,801 A | * 12/1984 | Hagan et al. | 702/128 |
| 4,549,272 A | 10/1985 | Hagan et al. | |
| 4,675,520 A | * 6/1987 | Harsen et al. | 250/222.2 |
| 4,773,029 A | * 9/1988 | Claesson et al. | 702/167 |
| 5,069,550 A | * 12/1991 | Kuwabara et al. | 356/640 |
| 5,141,110 A | 8/1992 | Trischan et al. | |
| 5,331,118 A | * 7/1994 | Jensen | 117/25.14 |
| 5,448,363 A | 9/1995 | Hager | |
| 5,469,262 A | * 11/1995 | Keen et al. | 356/639 |
| 5,501,571 A | * 3/1996 | Van Durrett et al. | 414/801 |
| 5,675,416 A | * 10/1997 | Campbell et al. | 356/367 |
| 5,865,990 A | 2/1999 | Novak et al. | |
| 6,137,577 A | * 10/2000 | Woodworth | 356/632 |

* cited by examiner

*Primary Examiner*—Donald P. Walsh
*Assistant Examiner*—Daniel K Schlak
(74) *Attorney, Agent, or Firm*—R. Michael West, Esq.; Boutin, Dentino, Gibson, Di Giusto, Hodell & West

(57) ABSTRACT

An apparatus and a method for sizing and sorting articles in an article stream. A scanning station includes a plurality of laser line beam generators and a linear array including a plurality of photo detectors. A first group of generators and detectors is horizontally oriented, and second group is vertically oriented. The area between the generators and the detectors defines an exposure window through which the articles are passed. Each line beam generator has a respective cylindrical lens for collimating its output across the exposure window. The output information is sampled, digitized, stored, and analyzed. Computer-based determinations are made regarding the size, configuration, and weight of the articles. Articles determined to have predetermined physical characteristics are selectively removed from the article stream, and directed to diverting conveyors carrying articles having like characteristics.

23 Claims, 9 Drawing Sheets

APPARATUS AND METHOD USING COLLIMATED LASER BEAMS AND LINEAR ARRAYS OF DETECTORS FOR SIZING AND SORTING ARTICLES

BACKGROUND OF THE INVENTION

1. Field of the Invention

The invention relates generally to apparatus for sorting articles, such as agricultural comestibles and manufactured products, according to their physical characteristics. More specifically, the invention pertains to devices which use laser beam generators and linear arrays of photo detectors to collect information about the size and configuration of articles. The invention also relates to devices which compare collected article information to predetermined criteria, make electronic sorting determinations, then segregate articles having like and kind characteristics from an article stream.

2. Description of the Prior Art

The prior art discloses a variety of article sizing and sorting devices using one or more light sources and respective photo detectors, arranged in spaced relation. Articles are passed between the light source and the detector, interrupting a light beam extending between the two. A shadow is thereby created on the photo detector, indicating the presence of the article. Information gained from successive sampling of the output of the photo detector is first stored and then subsequently compared to predetermined criteria, relating to physical aspects of the articles.

U.S. Pat. No. 5,865,990, granted to Novak et al., shows the use of a single laser generator, a lens, a single photo detector, and a processor for sorting imperfect rice grains from perfect grains. One embodiment shows the use of a cylindrical lens to produce a laser line from a single laser beam, for the exposure of multiple grains of rice.

U.S. Pat. No. 5,448,363, issued to Hager, teaches an apparatus for reflectively sorting comestibles, such as potatoes, using laser beams. Plural laser diodes and respective oscillating scanning mirrors, are arranged on a frame. The mirrors are directed radially and inwardly, toward a test zone, and are adapted periodically to scan a subject article. Articles free fall through an aperture near the test zone where they are exposed to the laser beams. The reflected light is detected by plural optical fibers, radially disposed around a ring on the frame. An optical ribbon extends circumferentially around the inside surface of the ring as well. Outputs from the optical fibers and the optical ribbon are fed to signal processing circuits.

In U.S. Pat. No, 3,930,994, to Conway et al., a method and an apparatus for inspecting and sorting produce are disclosed. The illuminating means includes a zirconium arc and a quartz-iodine tungsten light, in combination with a condensing lens for collimating the light. In an additional embodiment, two parallel beams are used for illuminating articles to be sorted. These beams are generated either by a single laser with a beam splitter, or a pair of lasers.

U.S. Pat. No. 4,490,801, granted to Hagan et al., illustrates an article sizing apparatus employing a plurality of LEDS as a light source, and a plurality of respective photo diodes as light detectors. The LEDS and detectors are arranged in two mutually perpendicular arrays, allowing multiple measurements of articles to be made in a single pass. The outputs of the detectors are delivered to a microprocessor, which stores and computes the detector output to make determinations of characteristics of the articles.

U.S. Pat. No. 4,549,272, to Hagan et al., shows an article sorting device including solenoid actuated paddle means to divert articles from an outlet conveyor belt into a container filled with articles of a like predetermined weight.

Lastly, in U.S. Pat. No. 5,141,110, issued to Trischan et al., an apparatus using collimating lenses is disclosed. The source of light in one embodiment is an incandescent bulb or a fluorescent light. In another embodiment, a single laser is used, eliminating the need for a collimating lens.

The above-described prior art has a number of operational characteristics which could be improved. For example, resolution, speed, accuracy, immunity from ambient light, immunity from contaminants such as dirt and water, and detection of misaligned articles are all areas where prior art sorting and sizing devices need improvement. The invention disclosed herein provides improved performance respecting all of these important aspects of operation, for sorting and sizing devices.

SUMMARY OF THE INVENTION

A laser-based, high-resolution, article sizing and sorting apparatus is disclosed. An input conveyor propels articles, such as comestibles or manufactured items, through a scanning station. The scanning station preferably includes first and second scanning means, arranged in orthogonal relation. Each scanning means features groups of laser line beam generators and respective linear arrays of photo detectors. Each group of laser generators is spaced from and parallel to its respective line of photo detectors. The components of the first scanning means preferably utilize horizontally oriented scanning beams, and the components of the second scanning means preferably utilize vertically oriented scanning beams. The area between the generators and the detectors defines a generally square and planar exposure window, through which articles are propelled in an unsupported condition during the scanning procedure.

Each line beam generator has a respective cylindrical lens for collimating its output into a plurality of parallel laser beams, directed across the exposure window. In one embodiment of the invention, three laser beam generators and their respective lenses are arranged in a line, each line extending six inches along two adjacent sides of the exposure window.

In the same embodiment of the invention, the complementary groups of the photo detectors include three linear arrays of detectors, arranged in end-to-end relation to span the other sides of the exposure window, opposite from a respective group of laser generators. The pitch, or numeric density of the detectors within the array determines the resolution of the sizing and sorting apparatus. In the preferred embodiment of the invention, adjacent photo detectors are quite close, on the order of 0.4 mm, or 1/64" apart. This spacing provides the high resolution of spatial data needed for accurate measurements and determinations regarding the size and configuration of subject articles.

The photo detectors provide analog output signals which are sampled and integrated during a scanning cycle. These analog outputs are first conditioned, and then fed to A/D converters where they are transformed into a digital number. The digitized outputs of the converters are directed to a microprocessor and associated memory devices, where they are organized and stored during a scanning operation comprised of successive scanning cycles. Computer-based analyses and determinations are made regarding the size, configuration, and weight of the articles. Articles determined to satisfy predetermined physical characteristics are electronically tracked and eventually diverted onto respective conveyors, carrying articles having like characteristics.

Accordingly, one object of the present invention is provide a device capable of measuring the size and configuration of articles, quickly and with a high degree of accuracy.

Another object is to provide an optical sorting device which is substantially immune from erroneous determinations caused by exposure to ambient light.

Yet another object is to provide a weather tight and easy to clean housing, for the sensitive laser beam and optical detector elements of the sorter.

Yet another object of the present invention is to provide a sorting device which makes accurate determinations for article size, configuration, and weight, over extended periods of time and in dusty, field conditions.

Yet another object of the invention disclosed herein is to provide a sorting device capable of accurately calculating the correct width and length of an article as it passes through a scanning station at any angle.

And, another object of the invention is to provide electronic sorting apparatus which can be incorporated in newly constructed sorters, and also can be retrofitted to existing sorting devices to improve their performance and expand their operational features.

DETAILED DESCRIPTION OF THE PREFERRED EMBODIMENT

Figure 1:
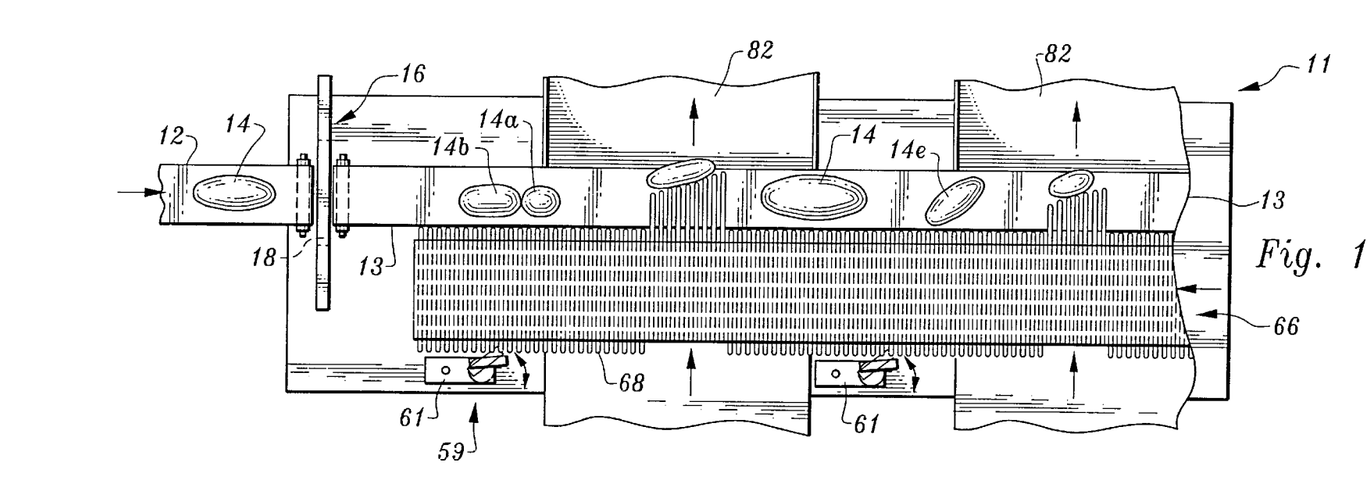
FIG. 1 is a top plan view of the apparatus, showing an input conveyor, a scanning station, an output conveyor, two article ejection stations, an article ejector belt, and two diversion conveyors.
Figure 2:
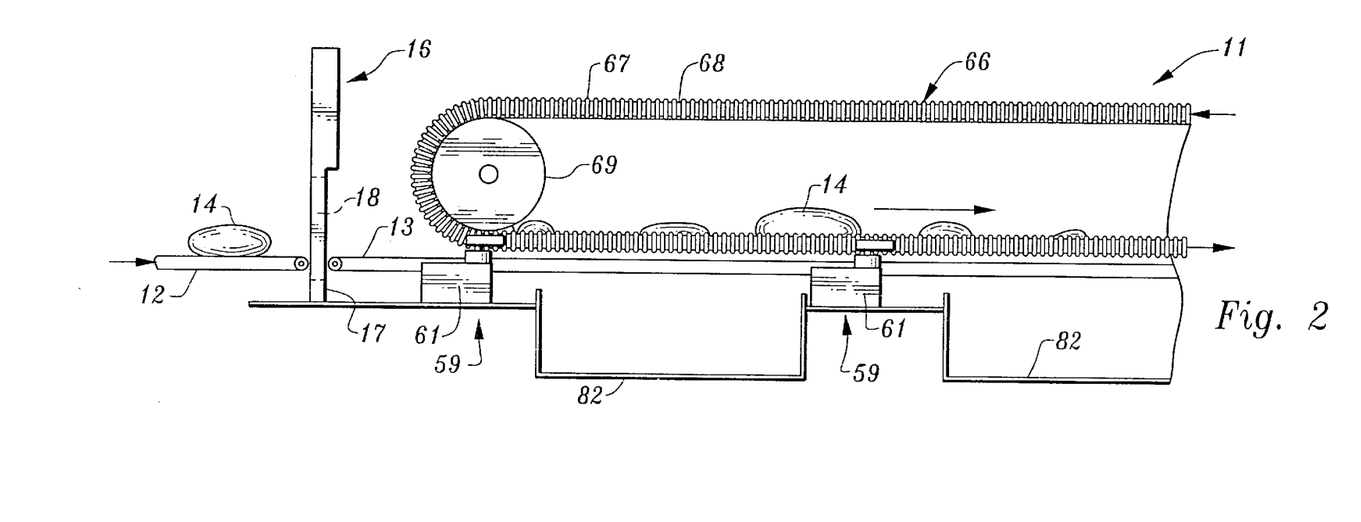
FIG. 2 is side elevational view of the apparatus shown in FIG. 1.

Turning now to the drawings, and in particular FIG. 1, the apparatus 11 includes an input conveyor 12 and an output conveyor 13, upon which articles 14 are transported through the apparatus for sizing and sorting. The articles 14 may be any type or variety of agricultural comestible or manufactured product. Examples of such agricultural comestibles are potatoes, onions, vegetables, or stone fruits. Manufactured products may include consumer goods, such as pet food, as well as industrial articles, such as hardware, components, or assemblies. The articles to be sorted are typically of differing size, configuration, or weight, and the apparatus 11 has programmable features which provide sorting operations based upon these or other user determined criteria.

A central feature of the apparatus is a scanning station 16, located within a narrow gap between a downstream terminus of the input conveyor 12 and an upstream terminus of the output conveyor 13. Scanning station 16 includes a planar frame 17, which is vertically oriented and transversely positioned between adjacent ends of conveyors 12 and 13. Frame 17 has a generally square illumination window 18, through which articles are passed for scanning. Strategically located on respective opposing sides of illumination window 18, are a first scanning means 19 and a second scanning means 21.

First scanning means 19 includes a group of laser line beam generators 22 and a linear array of photo diode detectors 23. It will be noted that first scanning means 19, in the preferred embodiment, is oriented to acquire height information, regarding articles to be sorted. Depending upon the application and the size of the desired illumination window, the number of line beam generators may be increased or decreased. In the application disclosed herein, three line beam generators 22 are utilized, providing an illumination line totaling approximately six inches in width. Although the particular laser generators which have been employed successfully for this application are the Model VLM3 manufactured by Coherent, of Auburn, Calif., other laser beam sources my be used as well. And, while the output frequency of the Model VLM3 is approximately 650 nm, other frequencies, such as infrared, may also be employed to practice the invention.

Figure 3:
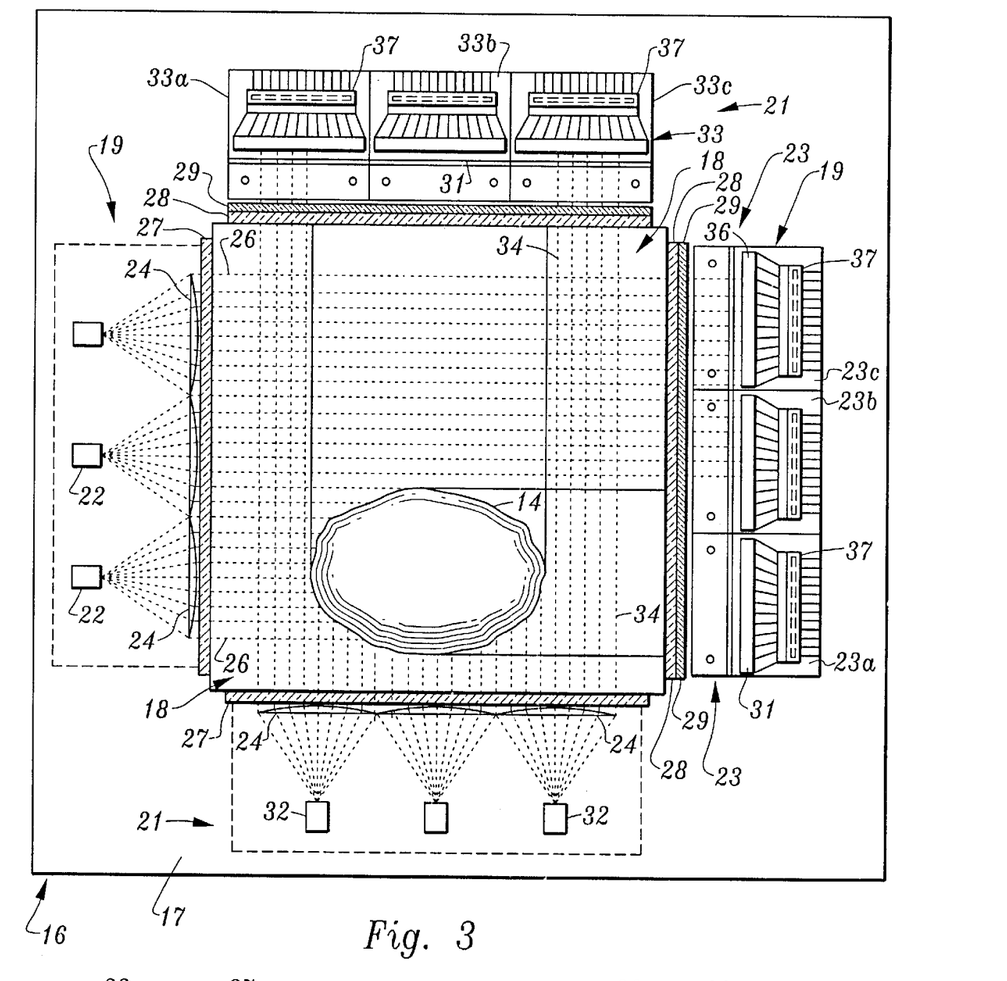
FIG. 3 is a front elevational view of a scanning station, showing first and second scanning means, sampling the physical characteristics of a single article passing through an exposure window.

The laser output of each line generator has a very narrow E plane beam width, and approximately a 30 to 45 degree H plane beam width. As shown in FIG. 3, the diverging laser beam output of each generator encounters a cylindrical lens 24. This results in a collimated laser beam 26, which horizontally traverses the illumination window 18 during an article sampling cycle.

It is important that whatever type of beam generator is used, the resultant light wave energy used to expose the articles is collimated. The apparatus herein works on the principle of article light blocking, in which the presence of an article causes a shadow on the detectors. Therefore, the use of collimated light energy ensures uniformity and accuracy in shadowing, irrespective of the distance between the beam generators and the detectors. Non-collimated light is diffuse, so that when articles pass there through, false shadows are created, ultimately resulting in inaccurate determinations of the article's physical characteristics.

Protecting the three cylindrical lenses 24 is an elongated strip of optical grade glass 27. In addition to protecting the lenses, the glass strip provides an easy surface for the operator to clean from time to time. Because the apparatus 11 will often be used in field or processing plant conditions, notorious for dust and other air borne pollutants, it is advantageous to be able to clean the operative scanning portions of the apparatus quickly and easily.

Across the exposure window 18 from the beam generators 22 is the linear array of photo detectors 23, further including sub-arrays 23a, 23b, and 23c. In order to protect the detectors 23 from dust and pollutants, another elongated strip of optical grade glass 28 is provided. Coextensive with and underlying glass 28 is an optical filter 29. The filter 29 passes only the wavelength of the laser beam, thereby preventing ambient light from adversely affecting the operation of the photo detectors 23. An optical reflector 31, having an orientation of approximately 45 degrees, intersects and redirects the beam 26 downwardly, toward photo detectors 23. (See, FIGS. 3 and 4).

An identical illuminating and detector arrangement to that just described is employed for second scanning means 21. Second scanning means 21, in the preferred embodiment, includes a group of three laser line beam generators 32 and a respective linear array of photo detectors 33, oriented to acquire width information regarding the articles to be sorted. In addition, three cylindrical lenses 24 are provided to collimate the laser beam output of generators 32 into a vertically directed laser beam 34. Strips of glass 27 and 28 are also provided on opposing sides of the illumination window 18, to protect respective elements of second scanning means 21. A filter 29 and an optical reflector 31 are included to pass and redirect beam 34 in a manner identical to that previously described for beam 26.

It should be noted that while the first and second scanning means in the preferred embodiment are, respectively, horizontally and vertically oriented, they need not be so oriented. For example, each scanning means may be oriented at an angle to the horizontal or the vertical, if that proves advantageous to scan the particular article more accurately or thoroughly. Also, one or more additional scanning means, or scanning stations, may be located upstream or downstream from the scanning station 16, to gain secondary or redundant information about the articles.

The linear array of photo detectors 33 is further comprised of sub-arrays 33a, 33b, and 33c. The arrays of photo detectors 23 and 33 are preferably designed so they may be arranged in end-to-end fashion in contingent relation, resulting in continuous, linear arrays of detectors. This characteristic is significant, as no physical gaps, or optical detection discontinuities, exist between the assembled arrays of detectors. As a consequence, complete and accurate information will be gained about the physical size and configuration of each article during the scanning process.

Applicants have determined that the commercially available Hamamatsu Model S6493-128 photo diode sub-arrays, with their associated signal processing circuit chips 36, are suitable components for assembling into linear array detectors 23 and 33. These sub-arrays are manufactured by Hamamatsu Photonics KK, of Hamamatsu City, Japan. Because the pitch of these particular sub-arrays is 0.4 mm between adjacent detectors, this results in 128 pixels, or channels of data, which is available from each of the sub-arrays.

Figure 5:
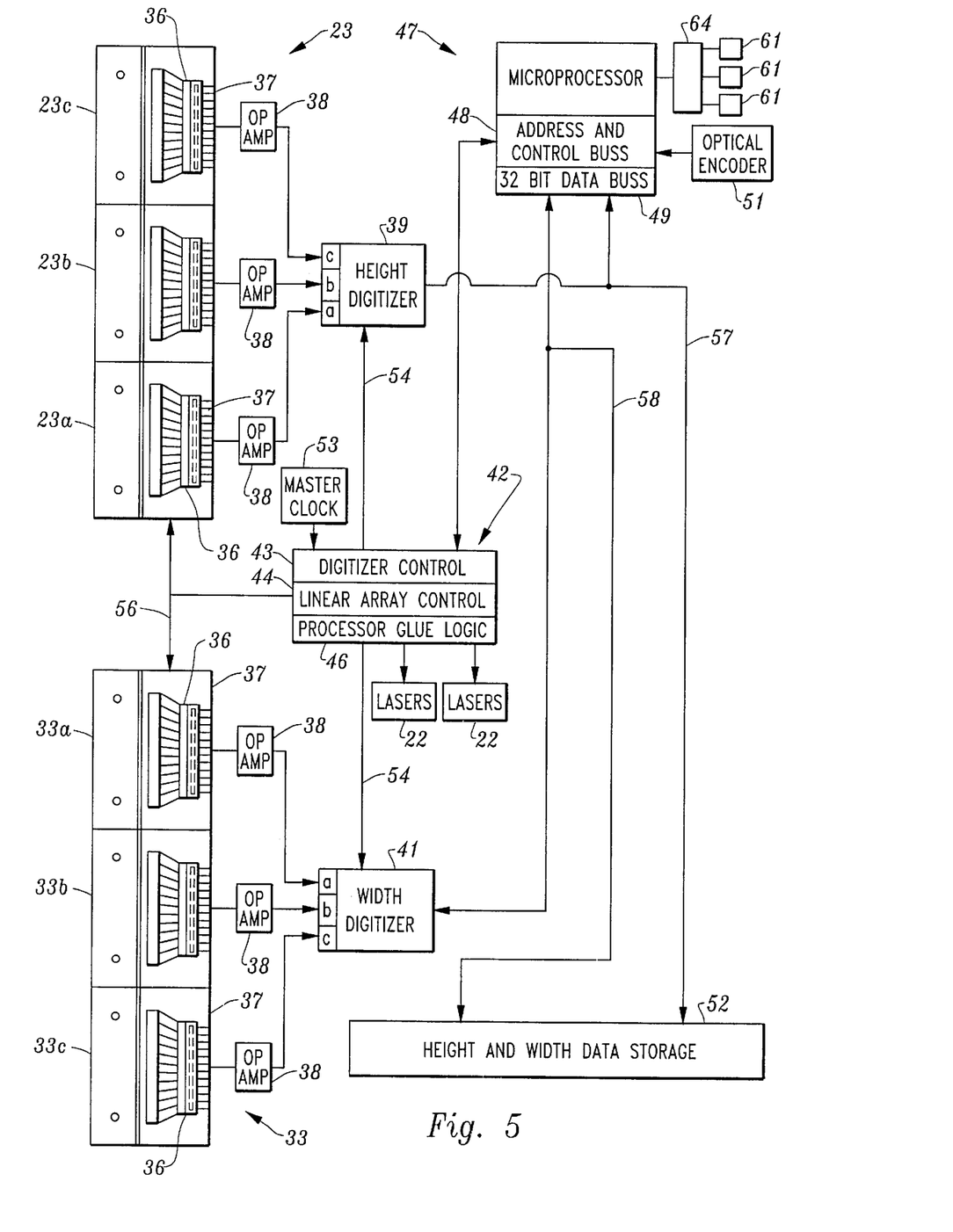
FIG. 5 is a block diagram, showing the major components for collecting, organizing, storing, and analyzing data about a sampled article.

Making reference now to FIG. 5, each of the sub-arrays 23a–23c, inclusive, and 33a–33c, inclusive, has a circuit chip 36 fed to a respective multiple pin output connector 37. An operational amplifier ("Op Amp") 38 is interconnected to each of the output connectors 37. The Op Amps 38 shift the levels of the outputs of the detectors contained within a respective sub-array of detectors. The outputs of three Op Amps 38, receiving data from sub-arrays 23a, 23b, and 23c, are fed to a height digitizer 39. The outputs of another three Op Amps 38, receiving data from sub-arrays 33a, 33b, and 33c, are fed to a width digitizer 41.

A master controller 42, includes: a digitizer controller 43, connected to digitizers 39 and 41; a linear array controller 44, connected to arrays 23 and 33 and lasers 22 and 32; and, processor glue logic 46, directing a microprocessor 47 within a computer. Integral with microprocessor 47 are address and control buss 48 and a 32 bit data buss 49. An optical encoder 51 provides an output to the microprocessor, corresponding to the phase or operational cycle of the sorting apparatus 11. The address and control bus 48 is interconnected to master controller 42. The 32 bit data buss 49 is interconnected to the outputs,of digitizers 39 and 41, as well as to a height and width data storage device 52. Lastly, a master clock 53, provides master controller 42 with pulses which direct and synchronize both the linear arrays and the digitizers.

Considering in the first instance, the scanning operation for a single article 14, input conveyor 12 advances the article 14 toward the scanning station 16 (see, FIG. 1). The speed and size of the article are such that it may be passed through the narrow gap created by the exposure window 18 in unsupported fashion. Moreover, the article does not tip or fall through the window, as it easily reaches the upstream terminus of output conveyor 13 before losing stability.

Figure 6:
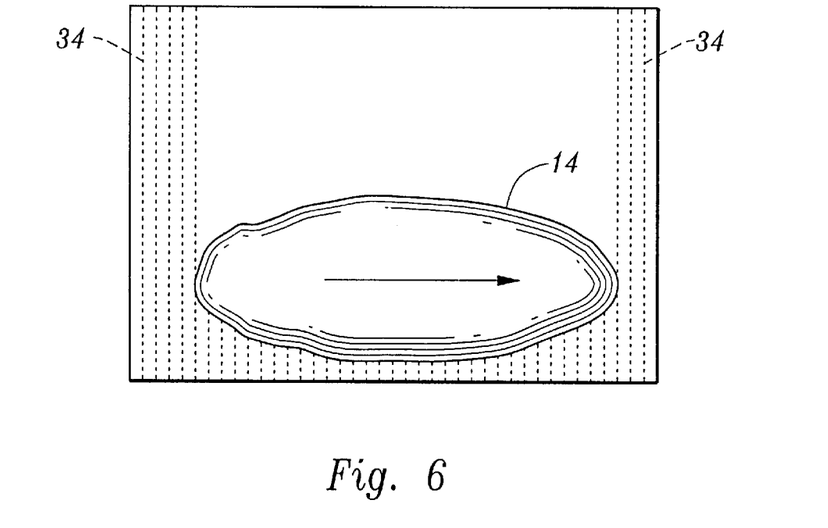
FIG. 6 is side elevational view, representing sequential scanning of a single article, as it passes longitudinally through the exposure window.

The scanning of successive transverse slices, or portions of a single article 14, each of which is carried out during a scanning cycle, is represented in FIG. 6. For simplification, the successive scanning cycles of only a single channel, seeking information about the width and length of the article, are shown in FIG. 6. It will be noted that as the article moves from left to right through the exposure window 18, successive scanning cycles, represented by laser beams 34, pass from the bottom to the top of the exposure window. As long as the beam 34 reaches the top of the exposure window and is detected by a respective photo detector 33, the apparatus makes a determination that the respective portion of the exposure window is empty. But once the beam 34 is blocked, apparatus interprets that data as an indication that an article is present.

Figure 4:
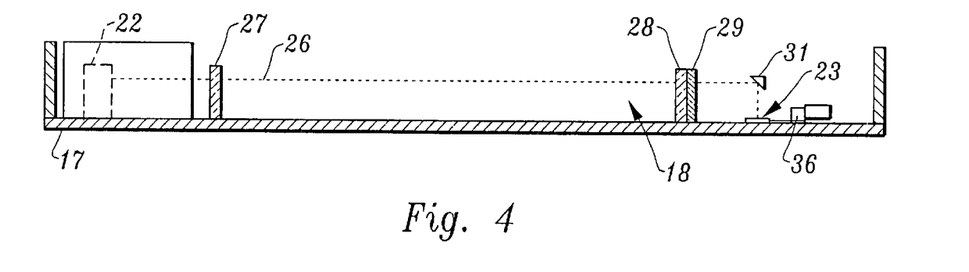
FIG. 4 is a fragmentary, cross-sectional view of a representative laser line beam generator, an array of photo detectors, and associated signal processing components.

A more comprehensive view of the scanning operation is shown in FIG. 4, where a plurality of both width and height channels is shown. In FIG. 4, a plurality of laser beams 26, used to determine height, and a plurality of laser beams 34, used to determine width, are shown. It is evident that successive horizontal and vertical transverse scans of the article as it passes through the exposure window, will provide information about height, width, length, and configuration of the article. From this information, the weight of the article may be determined, as well as conformance with predetermined standards regarding ideal or acceptable, size, weight, and shape for the article.

With this general background regarding the article scanning operation in the most basic mode of operation, attention can now be turned to how the individual components specifically carry out the scanning operation, make determinations, and act upon those determinations to sort the articles. The optical encoder 51 initiates a scanning cycle, by triggering an interrupt system in the microprocessor 47. The microprocessor then requests article data from the first and second scanning means, by sending a signal to the master controller 42. The master controller is an in-circuit programmable logic device, which synchronizes the height digitizer 39 and the width digitizer 41 with the arrays of photo detectors 23 and 33, by means of a digitizer control buss 54 and a linear array control buss 56. The glue logic 46 provided by the controller, enables the processor 47 to read the digitized pixel data delivered to the 32 bit data buss 49, and programming control registers within digitizers 39 and 41.

During each scanning cycle, the outputs of each of the photo detectors within the arrays 23 and 33 are sampled and integrated. Owing to the high resolution of these arrays, there is a total of 384 individual detectors in each array. Each of the detectors provides a pixel of data regarding the articles to be sorted. Accordingly, sub-array 23a provides pixels 1–128, sub-array 23b provides pixels 129–256, and sub-array 23c provides pixels 257–384, all relating to article height. Similarly, sub-array 33a provides pixels 1–128, sub-array 33b provides pixels 129–256, and sub-array provides pixels 257–384, all relating to article width.

The master controller 42 actuates the laser arrays 22 and 32 for a period which is approximately 25% of the entire scanning cycle. This limited period of exposure further enhances the rejection of any stray light within the exposure window. During the scanning cycle, the instantaneous output of each detector is integrated by signal processing circuit chip 36. At the end of each scanning cycle, the chips 36 are simultaneously triggered to output their cumulative pixel data. Each pixel represents an analog equivalent of the amount of laser energy which was collected by the detector during tile particular scanning cycle. The pixel data of the photo detectors are fed to respective operational amplifiers 38, which shift the signals to levels appropriate for the digitizers. The height digitizer 39 and the width digitizer 41 are actuated by a sample and hold control signal from master controller 42. This latches the incoming analog pixel signal while analog to digital conversion is taking place.

The master controller simultaneously triggers one pixel within each sub-array of detectors, and then sequentially repeats this triggering operation until all of the pixel data from one scanning cycle has been collected and digitized. For example, in the initial reading, the following pixels would be outputted simultaneously detector 23a-pixel 1, detector 23b-pixel 129, detector 23c-pixel 257, detector 33a-pixel 1, detector 33b-pixel 129, detector 33c-pixel 257. These six pixel outputs are simultaneously digitized, before the master controller triggers the next sequential pixel of each of the sub-arrays.

The microprocessor 47 reads the outputs of both digitizers 39 and 41 simultaneously. Height data is located on a low word data buss 57, bits 0 to 11, and the width data is located on a high word data buss 58, bits 16 to 27. The processor will clear unused bits 12 to 15 and 28 to 31 to zero, before storing the data to the 32 bit high speed data storage device 52. After the first six pixels are stored, the microprocessor increments all memory pointers within device 52 to store the next set of data. This process is completed until all pixels collected during a scanning cycle have been stored.

After storing the data for one scan, the microprocessor 47 determines if the vertical data has any blocked, or shaded pixels. If not, a determination is made that the exposure window 18 is empty. However, if a pixel is blocked, the microprocessor will direct the data to a circular image buffer, within data storage 52. The circular buffer provides a convenient means for storing several scanned images of the article, provides rapid access to the stored data, and minimizes memory usage. However, one of ordinary skill in the art will recognize that other equivalent means are available to store and process the pixel data.

The circular buffer includes a plurality of consecutive memory locations which are accessed by way of a pointer. The pointer directs incoming data to the next location available to store data. After the pointer reaches the last memory location, it is reset back to the first memory location. The circular buffer used in the present invention is of sufficient size to store at least three article images, so they may subsequently be processed and analyzed.

For example, the length of an article is determined first by counting how many scans the article was detected within the illumination window 18. In the present invention, a scan is stored every 1,125 micro seconds, and the conveyor belts are running at 250 feet per minute. With these operational parameters, each scan is equal to 0.0625 inches. Thus, the length of an article which was determined to block 15 scans would be 0.9375 inches.

In addition to determining the length of the article, the microprocessor 47 will convert the raw data for each scan stored in the circular buffer into an array of data, including the width, height, and square area of the article during that respective scan. Because each pixel of data is equal to 0.015625 inch, multiplying the number of blocked pixels by this factor will result in a measurement for the dimensional features of the article during that scan. Analyzing all of the data arrays for the article obtained during the article scanning operation, the microprocessor determines the maximum width, the maximum height, and the total of the square area for the article.

The weight of the article is dependent upon the density of its constituent material. A known density factor, stored in the microprocessor 47, corresponds to the weight of a scanned "slice" of the article, of a predetermined area. Thus, the actual weight of a scanned article is calculated by the microprocessor multiplying the cumulative square area for the article, by the known factor. This known density factor may easily be changed, by programming a new factor into the microprocessor which corresponds to the material of the articles to be scanned and sorted.

The microprocessor 47 is programmed to access a wide range of predetermined stored parameters for the height, width, length, weight, and configuration of the articles to be sorted. The microprocessor compares the scanned data with these parameters, and makes determinations about the physical characteristics of the scanned articles. Then, the microprocessor produces electrical signals to actuate an appropriate article ejection station 59, to segregate individual articles from the main article stream which have like and kind, or acceptable/unacceptable characteristics, in their size, weight, or shape.

Each article ejection station 59, includes an electric solenoid 61, having a rotatable element 62, with a deflection arm 63 mounted thereto. An ejector driver 64, having multiple outputs, converts the low current electrical signals of the microprocessor 47 into the relatively high current control signals necessary to actuate the solenoids 61 effectively (see, FIG. 5).

The article ejection stations are located adjacent an article ejector belt 66. Belt 66 is comprised of a plurality of linked ejector bar holders 67, each housing an elongated ejector bar 68. Each of the holders 67 includes an elongated passageway, sized and configured to accommodate a respective bar 68 in sliding relation. The linkage and spacing between the holders 67 is such that the belt 66 passes readily around a belt drum 69, located at either end of the belt.

Figures 10, 11, 12:
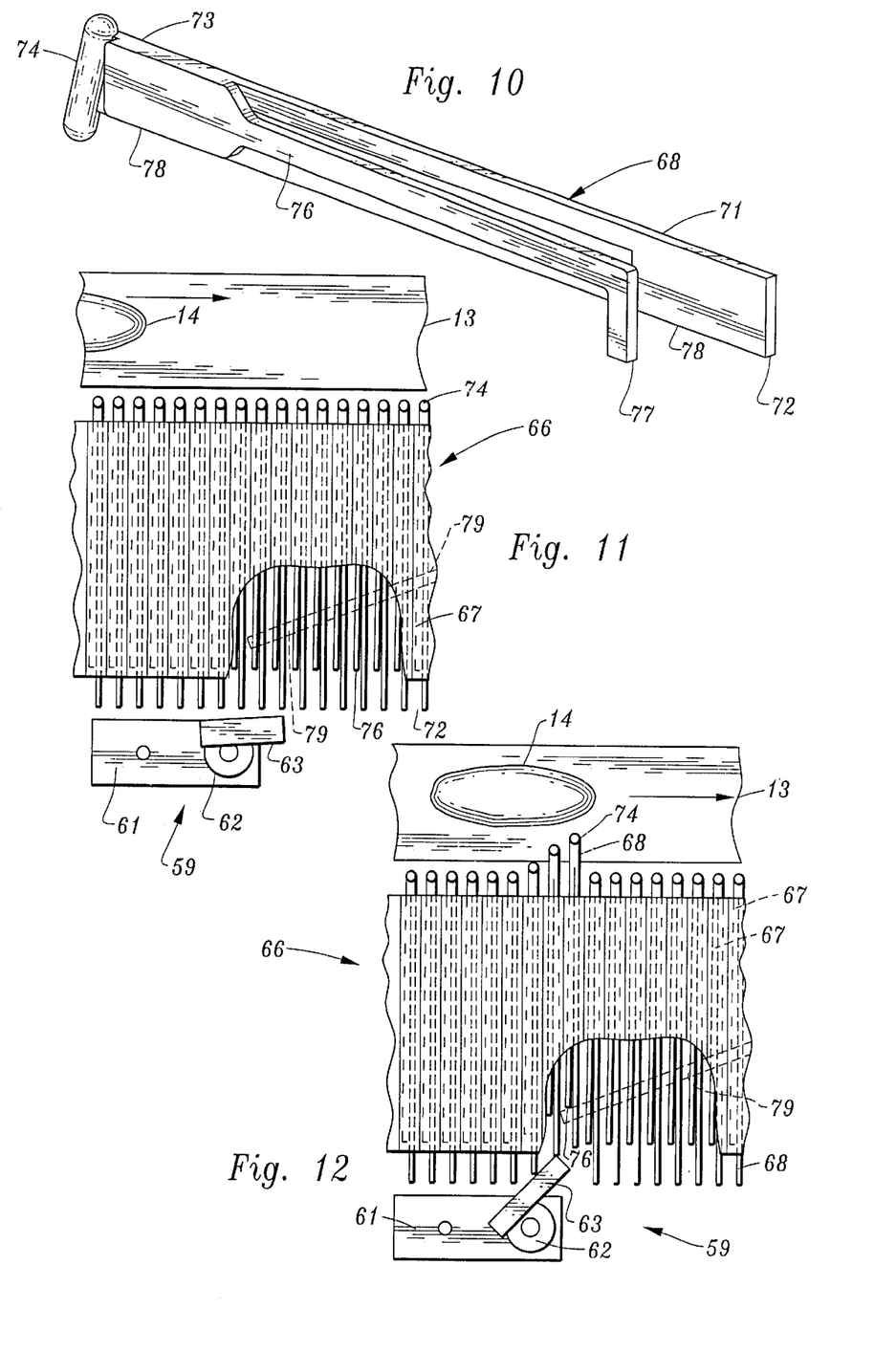
FIG. 10 is a perspective view of an article ejector bar, including a head on one end and a laterally extending cam follower.
FIG. 11 is a fragmentary top plan view of the article ejection belt, a portion thereof being broken away to show a non-engaged relationship between the cam followers and an underlying cam.
FIG. 12 is a view as in FIG. 11, but showing an engaged relationship between the cam followers of selected ejection bars and the cam.

Making particular reference now to FIG. 10, it should be noted that the ejector bar 68 is an integral structure, typically molded into a single piece, from a resilient plastic material. Bar 68 includes a first end 71 having a flat surface 72, and a second end 73, having a cylindrical bumper head 74. A flexible cam engagement arm 76 extends from second end 73, and runs generally parallel to the main body portion of bar 68. A downwardly directed foot 77 is located at the end of arm 76, extending below a lower edge 78 of bar 68. It is particularly important that engagement arm 76 is integrally molded with bar 68, rather than being attached mechanically or adhesively. As will be explained below, arm 76 is subjected to repeated flexure forces, and is therefore subject to breakage and detachment from the bar 68. It has been determined that by integrally molding arm 76 with bar 68, the reliability and longevity of the ejection bar is enhanced.

Figure 15:
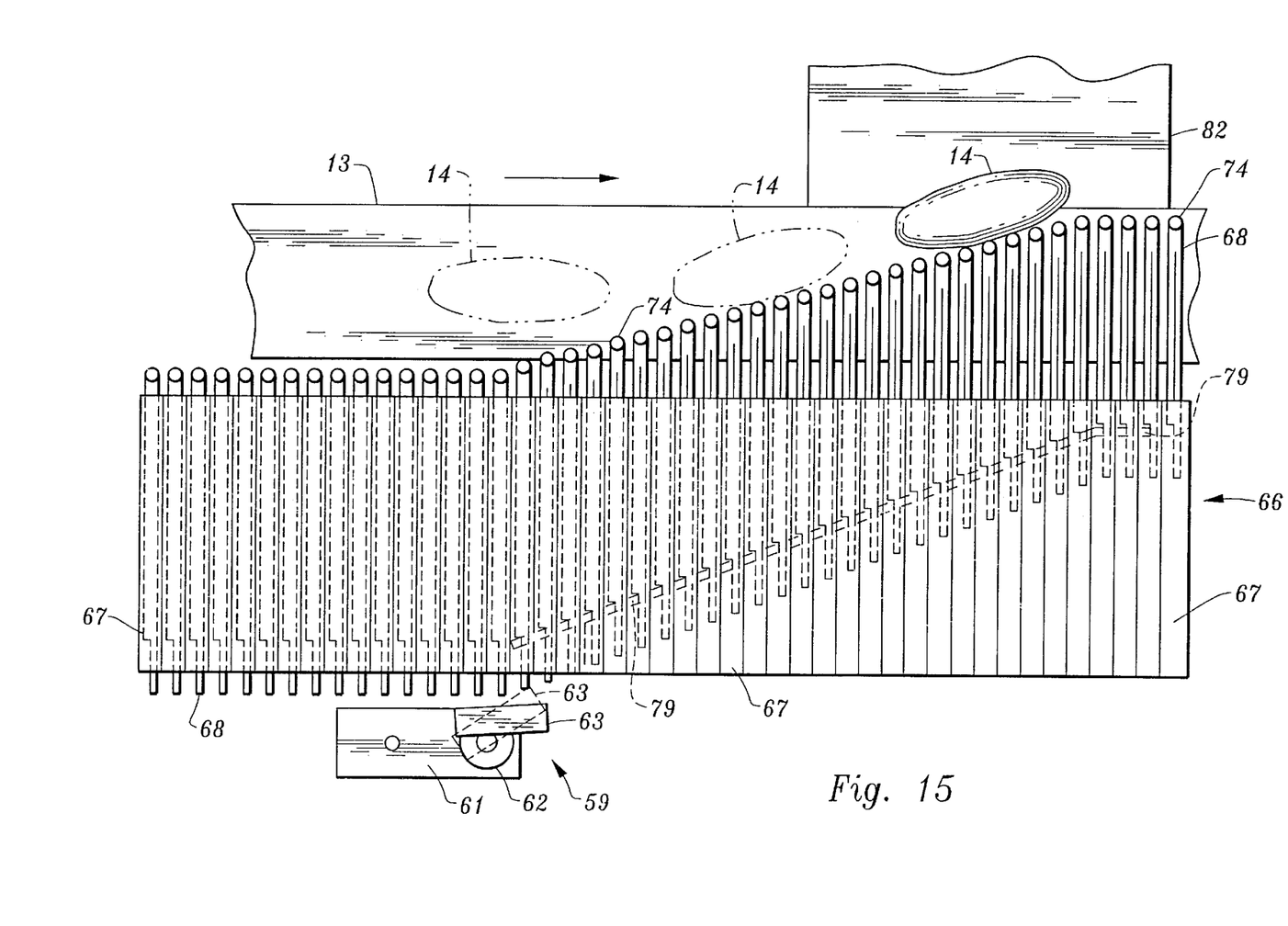

An elongated bar cam 79, is disposed beneath the lower run of belt 66, each cam 79 having an upstream end 81 adjacent a respective article ejection station 59. As shown in FIG. 15, cam 79 substantially traverses the width of belt 66. When the electric solenoid 61 is in a resting, or non-actuated position, deflection arm 63 is withdrawn and in spaced relation from any part of the belt 66 (see, FIG. 11). In that circumstance, ejector bars 68 remain fully retracted within the belt, and the bumper head 74 is spaced from output conveyor 13 and any article 14 thereon.

Figure 13:
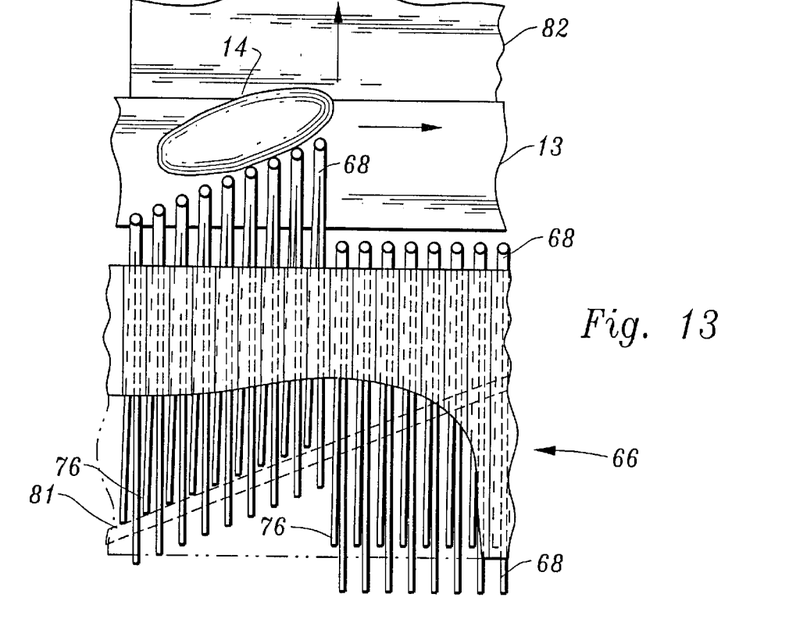
FIG. 13 is a view similar to FIG. 12, but now showing the heads of the selected ejection bars beginning to urge an article off the output conveyor.
Figure 14:
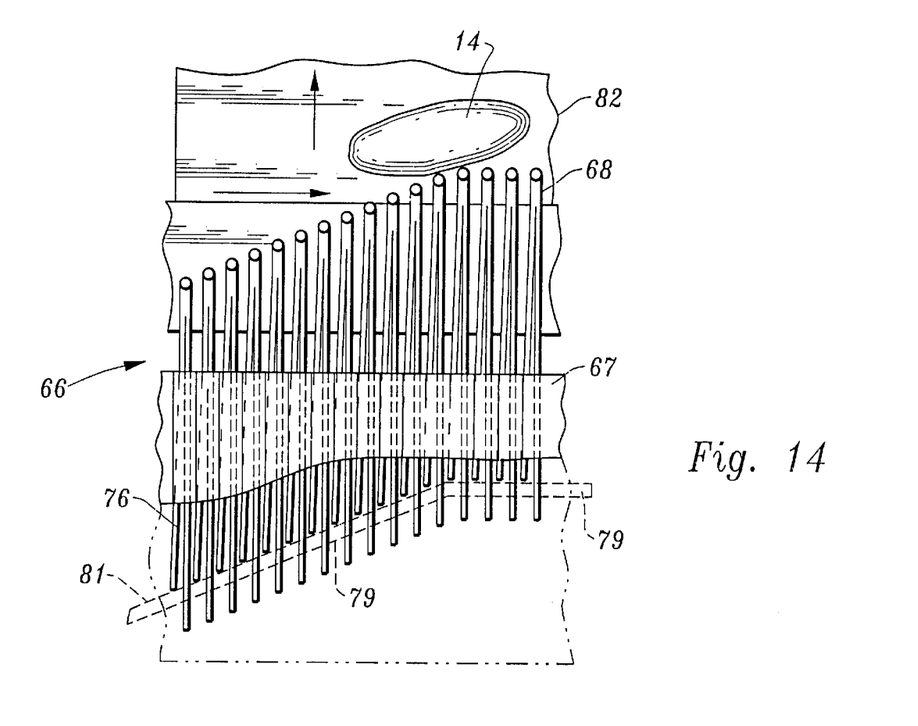
FIG. 14 is a view similar to FIG. 13, but now showing the article laterally displaced off the output conveyor and onto a diversion conveyor, and, FIG. 15 is a top plan view of an article ejection station and a fragment of the ejection belt, representing a summary of the article ejection steps shown in FIGS. 12–14.

However, when microprocessor 47 issues an electrical signal to effect segregation of a selected article 14 from the main article stream, solenoid 61 is thereby actuated, rotating deflection arm into an extended position (see, FIG. 12). The first end 71 of an ejector bar 68 impinges upon the extended deflector arm, and continued forward motion of the belt effects translation of the ejector bar toward the output conveyor 13. As shown in FIGS. 12 and 13, the extent of the translation is sufficient to urge foot 77 into engagement with the working surface of cam 79. Thereafter, the angled surface of the cam coupled with further forward movement of belt 66 effects sufficient translation of the ejector bar 68 so that bumper head 74 comes into contact with the selected article 14. As the article moves farther down conveyor 13 and successive ejection bars 68 extend farther across the conveyor, the article is eventually displaced laterally to fall onto a diversion conveyor 82. Once on the diversion conveyor, the selected article 14 may be transported either to a carton filler or a bagger (not shown).

Figure 7:
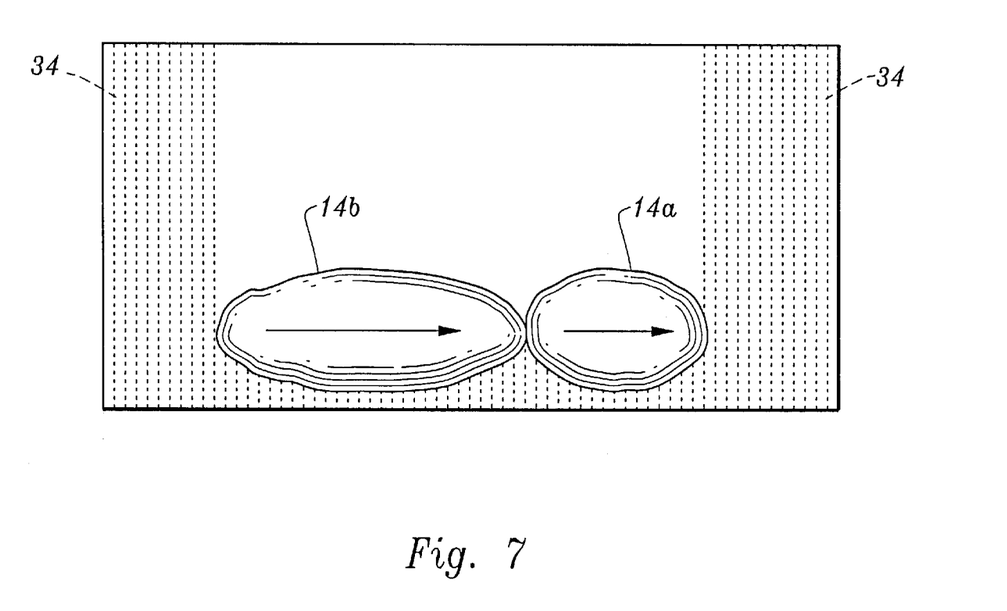
FIG. 7 is a view as in FIG. 6, but showing two contingent articles passing through the exposure window.

The aforementioned scanning and sorting operation addresses the processing of a single article 14, passing through exposure window 18. However, other circumstances arise during sizing and sorting of articles, which require special processing. The first situation which can occur is an end-to-end arrangement of two articles passing through the exposure window, as shown in FIG. 7. The computer program operating the microprocessor 47 is adapted to make a determination that two articles 14a and 14b are in fact touching, so that the data collected about each will be treated separately and that individual and proper segregation of the articles will be made. As described before, the exposure window is determined as empty, on the scan which occurs just before the first article 14a enters the exposure window. As with a single article, storing of the product image begins when the leading edge of the first article 14a is detected. When the program determines that the height has first reached a maximum, and then is getting smaller, the program logic looks for one of three conditions to occur on the next scan.

The first condition is that the height of the next scan is the same as the last. In this case, the program stores the current scan and waits for the next scan. The second condition is that the exposure window is empty. In that event, normal processing of the article image will be triggered. The third condition arises when a second article 14b is touching the first article 14a. In this third condition the next scan detects that the height is again getting larger. The program logic makes a determination in this third condition that another article is present, and begins storing successive data as that of a second article 14b. Then, when the exposure window is detected as empty, the second article's image is processed. The program will process the data identically if more than two articles were touching end-to-end.

Figure 8:
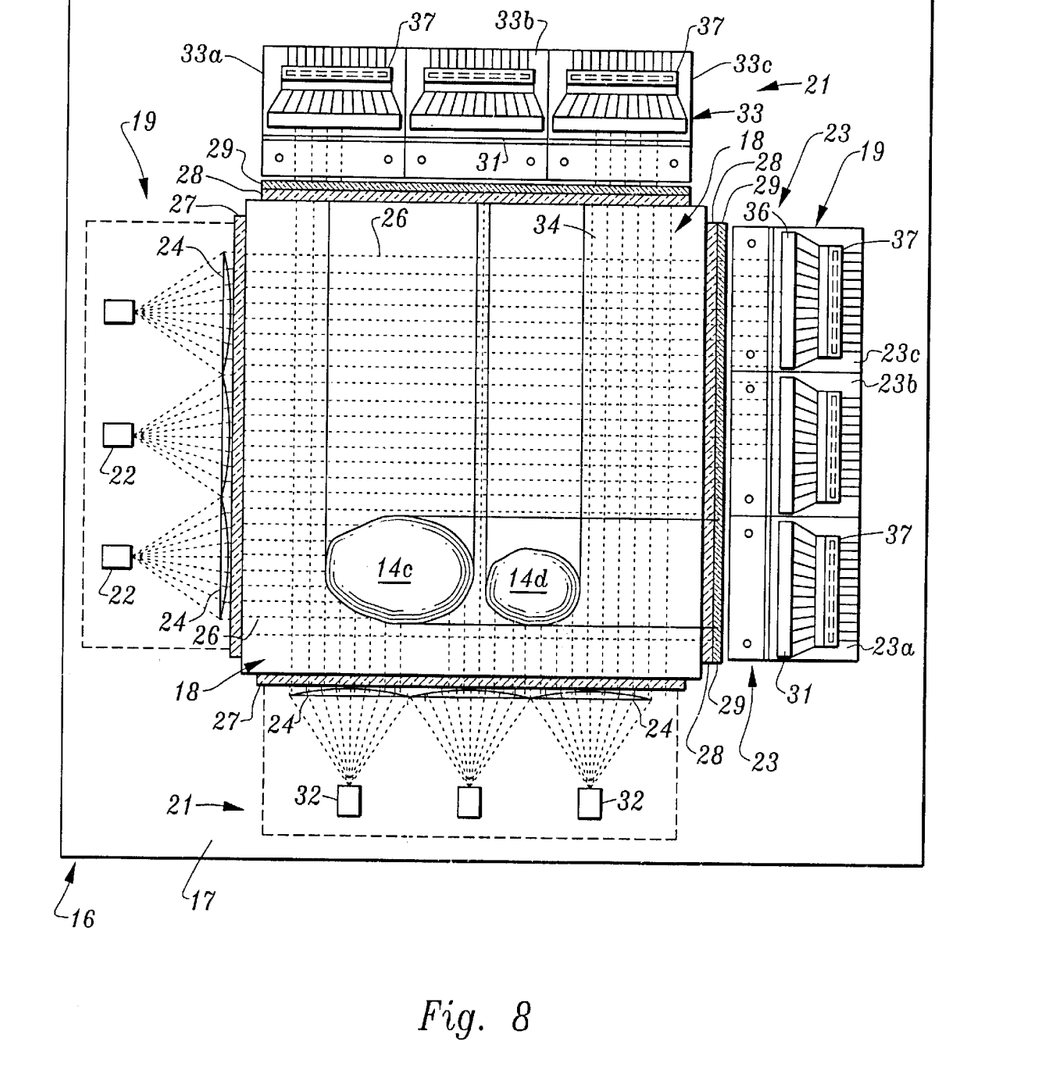
FIG. 8 is a view as in FIG. 3, but showing two laterally adjacent articles passing through the scanning station.

A second situation arises when two or more laterally adjacent articles, termed "doubles", pass concurrently through the exposure window 18 (see, FIG. 8). To detect doubles, the computer program searches the width data of the current image being processed, counting how many article edges are present. For example, in FIG. 8, the computer will first detect the left hand edge and then the right hand edge of the article 14c. When a third article edge is detected, namely, the left hand edge of article 14d, the computer program determines that doubles are present. Then, the microprocessor 47 allows the articles to pass from the output conveyor to a return conveyor (not shown), so the articles 14c and 14d may be reprocessed through the apparatus 11.

A third situation results from the axis of the article being misaligned, or not perpendicular, with respect to the planar frame 17 of the scanning station 16 (see, article 14e in FIG. 1). In this situation, data obtained about the width of scanned article will not be accurate, as the article casts a wider shadow on the array of photo detectors 33 than it should. Furthermore, the article will be in the exposure window for fewer scans than it should be. Because the article length is calculated from the number of scans the product is detected in the exposure window, the data obtained about the length of the article will be inaccurate as well.

To correct for axial misalignment of the article 14e, the computer program first calculates the differences between the pixel locations for the leading edge and the trailing edge of the article 14e as it passes through the scanning station. Because the axis for the article lies upon an imaginary line drawn between these two edges, the computer program can then calculate the angular orientation of the article's axis with respect to the longitudinal axes of conveyor belts 12 and 13. Using trigonometric functions, the program calculates the width and length of the article. The program multiplies the scanned article width by the cosine of the angle. This provides the correct width of the article. In like manner, the program multiples the scanned length of the article by the cosecant of the angle, providing a corrected and accurate length for the article.

Figure 9:
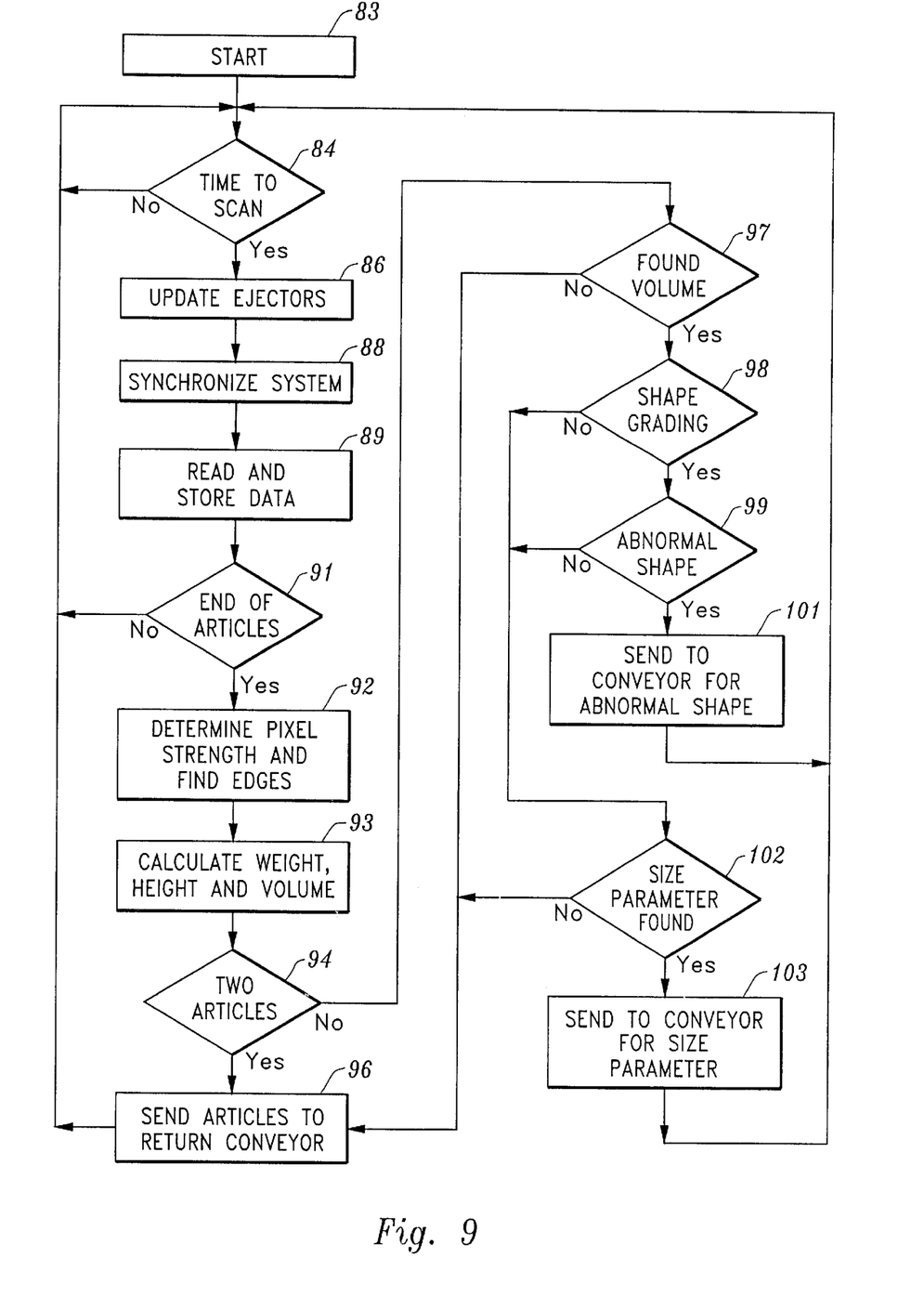
FIG. 9 is a functional block diagram, depicting the process implemented in carrying out the present invention

A summary of the operational features and processing steps of the apparatus 11 are presented in the flow diagram of FIG. 9. In a first step 83, the apparatus is started. If it is determined, in step 84, that it is time to scan, the ejectors at each ejection station are updated (step 86). Then, the overall system, including the microprocessor, the clocks, and the master control, is synchronized (step 88), by the optical encoder triggering the interrupt of the microprocessor 47. In step 89, the article data is read and stored.

A determination 91 is made, whether or not the end of the article was just scanned. If not, the system returns to step 84 for further scanning. However if the end of the article was detected, then article image processing begins. In step 92, a determination is made regarding pixel strength and the distances between the various edges of the article. A calculation is made regarding weight, height, and volume of the article, in step 93. A determination 94 is made, whether one or two articles are present in the exposure window. If two or more articles are present, in step 96, the articles are sent to a return conveyor for reprocessing. If only one article is present, a decision is made in step 97, whether the volume has been found or not. If not, the article is sent to the return conveyor for reprocessing. In step 98, a decision is made whether shape grading parameters are to be applied in assessing the article, or not. If so, a determination 99 is made regarding the article's shape. Shape grading parameters may include aspects such as overall article configuration (i.e. hook shape) or individual surface features on the article, such as a knob. If the article is determined to have an abnormal shape, it is sent, in step 101, to a diverting conveyor for abnormally shaped articles. If shape grading is not to be applied, or if the article is determined not to be abnormal in shape, the processing continues to step 102.

In step 102, the overall dimensional aspects of the scanned article, such as height, length and width, are compared to predetermined size parameters for an ideal or acceptable article. If a size parameter is found, the scanned article is sent, in step 103, to a diverting conveyor corresponding to the satisfied size parameter. If a size parameter is not found, the article is sent to the return conveyor, for reprocessing. This process then is repeated, for processing successive articles passing through the exposure window of the apparatus.

It will be appreciated, therefore, that we have disclose herein an apparatus and a method for sizing and sorting articles which uses laser beams and photo detectors, and provides superior operational reliability and accuracy.

We claim:

1. An apparatus for sizing and sorting an article located within a stream of articles, comprising:
    a. a scanning station, including first and second groups of laser line beam generators and respective linear arrays of photo detectors arranged in orthogonal relation with respect each other thereby defining an exposure window, said first and second groups of laser line beam generators and respective linear arrays of photo detectors producing output signals corresponding to a height and a width of a portion of an article within said exposure window during a scanning cycle;
    b. means for passing the article entirely through said exposure window during an article scanning operation;
    c. means for converting said output signals of said first and second scanning means into digitized numbers;
    d. means for storing said digitized numbers, generated during said scanning operation;
    e. means for comparing said stored digitized numbers with predetermined parameters corresponding to a desired size, or weight, or configuration of an article; and,
    f. means responsive to said comparing means, for segregating the article from the stream of articles, if said digitized numbers meet said predetermined parameters.

2. An apparatus as in claim 1, in which each said group of laser line beam generators produces collimated beams.

3. An apparatus as in claim 1, in which said photo detectors are aligned end to end, in contingent relation.

4. An apparatus as in claim 1, in which said means for passing the article entirely through said exposure window in an unsupported state includes an input conveyor and an output conveyor, and in which a gap exists between a downstream end of said input conveyor and an upstream end of said output conveyor, and in which said first and second scanning means are transversely positioned across said gap.

5. An apparatus as in claim 1 in which the article to be sized and sorted is a first article which is touching a second article, and in which said means for storing digitized numbers further includes means for storing digitized numbers pertaining to said first and second articles separately.

6. An apparatus as in claim 1 in which two or more laterally adjacent articles pass concurrently through said exposure window, and in which said means for comparing said stored digitized numbers directs said segregating means to send said articles to a return conveyor for reprocessing by said apparatus.

7. An apparatus as in claim 1 in which said exposure window is planar, and in which the article has an axis which is not perpendicular to the plane of said exposure window during said scanning operation, and in which said means for storing said digitized numbers includes means to correct said digitized numbers, so they correspond to an actual size of the article.

8. An apparatus for sizing and sorting articles within an article stream, comprising:
    a. a scanning station, including first and second scanning means, each of said scanning means having at least one laser line beam generator and a respective linear array of photo detectors, said laser generator being spaced from and parallel to said array of photo detectors, each of said photo detectors producing an output signal corresponding to the amount of laser beam energy received from a respective said generator during a scanning cycle;
    b. a generally planar exposure window, said exposure window being within said scanning station and defined by an area between said first and second scanning means;
    c. a cylindrical lens adjacent each said line beam generator, for collimating its output into a plurality of parallel laser beams, directed across said exposure window;
    d. an input conveyor and an output conveyor, propelling individual articles through said exposure window in an unsupported condition, during a respective article scanning operation;
    e. computer means for sampling and storing said outputs of said photo detectors for successive sampling cycles during said article scanning operation, and comparing said stored outputs with predetermined parameters;
    f. article ejection means, responsive to said computer means, for removing an article from the article stream if said stored outputs and said predetermined parameters bear a desired or undesired relationship.

9. An apparatus as in claim 8, in which a gap exists between a downstream end of said input conveyor and an upstream end of said output conveyor, and in which said first and second scanning means are transversely positioned across said gap.

10. An apparatus as in claim 8 in which the article to be sized and sorted is a first article which is touching a second article in the article stream, and in which said computer means further includes means for storing digitized numbers pertaining to said first and second articles separately.

11. An apparatus as in claim 8 in which two or more laterally adjacent articles pass concurrently through said exposure window, and in which said computer means sends said articles to a return conveyor for reprocessing by said apparatus.

12. An apparatus as in claim 8 in which said exposure window is planar, and in which the article has an axis which is not perpendicular to the plane of said exposure window during said scanning operation, and in which said computer means includes means to correct said digitized numbers, so they correspond to an actual size of the article.

13. An apparatus for sizing an article in an article stream, comprising:
   a. a scanning station, including at least one collimated laser line beam generator and a respective linear array of photo detectors, said laser generator being spaced from and parallel to said array of photo detectors, each of said photo detectors producing an output signal corresponding to the amount of laser beam energy received from said generator during a scanning cycle;
   b. an exposure window, said exposure window being within said scanning station and defined by an area between said laser generator and said photo detectors;
   c. conveyor means for propelling the article through said exposure window in an unsupported condition, during an article scanning operation;
   d. computer means for sampling and storing said outputs of said photo detectors separately for successive sampling cycles during said article scanning operation, and comparing said stored outputs with predetermined parameters to determine the size of the article; and,
   e. means for diverting the article from the article stream if said stored outputs and said predetermined parameters bear a desired or undesired relationship.

14. An apparatus as in claim 13 in which the article to be sized is a first article which is touching a second article in the article stream, and in which said computer means further includes means for storing said outputs pertaining to said first and second articles separately.

15. An apparatus as in claim 13 in which two or more laterally adjacent articles pass concurrently through said exposure window, and in which said computer means sends said articles to a return conveyor for reprocessing by said apparatus.

16. An apparatus as in claim 13 in which said exposure window is planar, and in which the article has an axis which is not perpendicular to the plane of said exposure window during said scanning operation, and in which said computer means further includes means to correct said outputs, so they correspond to an actual size of the article.

17. A method for sorting an article in an article stream with respect to parameters of size, weight, or configuration, comprising the steps of:
   a. providing a scanning station having a planar exposure window;
   b. providing first and second, orthogonally oriented laser beams, extending across said exposure window in orthogonal fashion during successive scanning cycles;
   c. detecting said laser beams with respective first and second linear arrays of photo detectors, and providing outputs from each said detector corresponding to a respective amount of laser beam energy detected during each said scanning cycle;
   d. passing the article entirely through said exposure window in an unsupported condition during an article scanning operation, exposing transverse portions of the article to the laser beam scans and shadowing respective photo detectors during successive said scanning cycles;
   e. sampling and storing said outputs from each said detector during said article scanning operation;
   f. comparing said stored outputs to predetermined parameters, respecting article size, or weight, or configuration; and,
   g. diverting the article from the article stream if said stored outputs and said predetermined parameters bear a desired or undesired relationship.

18. The method of claim 17 in which the article to be sized is a first article which is touching a second article in the article stream, and further including the step of storing said outputs pertaining to said first and second articles separately.

19. The method of claim 17 in which two or more laterally adjacent articles pass concurrently through said exposure window, and further including the step of sending said laterally adjacent articles back through said sampling station for reprocessing.

20. The method of claim 17 in which the article has an axis which is not perpendicular to the plane of said exposure window during said scanning operation, and further including the step of correcting said outputs, so they correspond to an actual size of the article.

21. An apparatus for sizing a first article touching a second article in an article stream, comprising:
   a. a scanning station, including at least one collimated laser line beam generator and a respective linear array of photo detectors, said laser generator being spaced from and parallel to said array of photo detectors, each of said photo detectors producing an output signal corresponding to the amount of laser beam energy received from said generator during a scanning cycle;
   b. an exposure window, said exposure window being within said scanning station and defined by an area between said laser generator and said photo detectors;
   c. conveyor means for propelling the first and second articles through said exposure window in an unsupported condition, during an article scanning operation; and,
   d. computer means for sampling and storing said outputs of said photo detectors pertaining to the first and second articles separately for successive sampling cycles during said article scanning operation, and comparing said stored outputs with predetermined parameters to determine the respective sizes of the articles.

22. An apparatus for sizing an article, comprising:
   a. a scanning station, including at least one collimated laser line beam generator and a respective linear array of photo detectors, said laser generator being spaced from and parallel to said array of photo detectors, each of said photo detectors producing an output signal corresponding to the amount of laser beam energy received from said generator during a scanning cycle;
   b. an exposure window, said exposure window being within said scanning station and defined by an area between said laser generator and said photo detectors;
   c. conveyor means for propelling the article concurrently through said exposure window in an unsupported condition during an article scanning operation; and,
   d. computer means for sampling and storing said outputs of said photo detectors for successive sampling cycles during said article scanning operation, and comparing said stored outputs with predetermined parameters to determine the size of the article, whereby two or more laterally adjacent articles pass concurrently through said exposure window, and in which said computer means further includes means to send the two or more laterally adjacent articles to a return conveyor for individual sizing by said apparatus.

23. An apparatus for sizing an article, comprising:
a. a scanning station, including at least one collimated laser line beam generator and a respective linear array of photo detectors, said laser generator being spaced from and parallel to said array of photo detectors, each of said photo detectors producing an output signal corresponding to the amount of laser beam energy received from said generator during a scanning cycle;
b. a planar exposure window, said exposure window being within said scanning station and defined by an area between said laser generator and said photo detectors, the article having an axis which is not perpendicular to the plane of said exposure window during said scanning cycle;
c. conveyor means for propelling the article through said exposure window in an unsupported condition during a article scanning operation;
d. computer means for sampling and storing said outputs of said photo detectors for successive sampling cycles during said article scanning operation, correcting said stored outputs to compensate for non-perpendicular alignment between the axis of the article and said plane of said exposure window, and comparing said stored outputs with predetermined parameters, to determine the actual size of the article.

* * * * *